(12) United States Patent
Tolfmans

(10) Patent No.: US 9,129,121 B2
(45) Date of Patent: *Sep. 8, 2015

(54) LOCATING CRYPTOGRAPHIC KEYS STORED IN A CACHE

(71) Applicant: NetApp, Inc., Sunnyvale, CA (US)

(72) Inventor: Joakim Tolfmans, Falun (SE)

(73) Assignee: NetApp, Inc., Sunnyvale, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/934,107

(22) Filed: Jul. 2, 2013

(65) Prior Publication Data

US 2013/0326233 A1 Dec. 5, 2013

Related U.S. Application Data

(63) Continuation of application No. 12/110,631, filed on Apr. 28, 2008, now Pat. No. 8,494,168.

(51) Int. Cl.
*H04L 9/00* (2006.01)
*G06F 21/60* (2013.01)
*G06F 21/79* (2013.01)
*H04L 9/08* (2006.01)

(52) U.S. Cl.
CPC .............. *G06F 21/602* (2013.01); *G06F 21/79* (2013.01); *H04L 9/0894* (2013.01); *G06F 2221/2107* (2013.01); *H04L 9/0816* (2013.01); *H04L 9/0819* (2013.01); *H04L 9/0822* (2013.01); *H04L 9/0838* (2013.01)

(58) Field of Classification Search
CPC ... H04L 9/0894; H04L 9/0838; H04L 9/0816; H04L 9/0819; H04L 9/0822; G06F 21/79
USPC ............... 713/150–194; 380/44–47, 277–286
See application file for complete search history.

(56) References Cited

U.S. PATENT DOCUMENTS

| 4,656,474 A | 4/1987 | Mollier et al. |
| 5,481,610 A | 1/1996 | Doiron et al. |
| 5,825,880 A | 10/1998 | Sudia et al. |
| 6,118,874 A | 9/2000 | Okamoto et al. |

(Continued)

OTHER PUBLICATIONS

Office Action mailed Mar. 3, 2011, for related U.S. Appl. No. 12/110,631, filed Apr. 28, 2008, 22 Pages.

(Continued)

*Primary Examiner* — Jeffrey Pwu
*Assistant Examiner* — Jayesh Jhaveri
(74) *Attorney, Agent, or Firm* — Mahamedi Paradice LLP

(57) ABSTRACT

Example embodiments provide various techniques for locating cryptographic keys stored in a cache. The cryptographic keys are temporarily stored in the cache until retrieved for use in a cryptographic operation. The cryptographic key may be located or found through reference to its cryptographic key identifier. In an example, a particular cryptographic key may be needed for a cryptographic operation. The cache is first searched to locate this cryptographic key. To locate the cryptographic key, the cryptographic key identifier that is associated with this cryptographic key is provided. In turn, the cryptographic key identifier may be used as an address into the cache. The address identifies a location of the cryptographic key within the cache. The cryptographic key may then be retrieved from the cache at the identified address and then used in the cryptographic operation.

15 Claims, 8 Drawing Sheets

(56) References Cited

U.S. PATENT DOCUMENTS

| | | |
|---|---|---|
| 6,577,734 B1 * | 6/2003 | Etzel et al. .................... 380/277 |
| 6,928,167 B1 | 8/2005 | Maeda et al. |
| 7,929,692 B2 | 4/2011 | Kim et al. |
| 7,975,150 B1 * | 7/2011 | Lillibridge et al. ........... 713/193 |
| 8,094,819 B1 * | 1/2012 | Limondin et al. ............ 380/228 |
| 2004/0139264 A1 * | 7/2004 | Gros et al. .................... 710/305 |
| 2004/0228479 A1 | 11/2004 | Crispin et al. |
| 2005/0135626 A1 * | 6/2005 | Ball et al. ..................... 380/277 |
| 2005/0160279 A1 * | 7/2005 | Henry et al. .................. 713/189 |
| 2005/0188216 A1 * | 8/2005 | Crispin et al. ................ 713/190 |
| 2006/0034461 A1 * | 2/2006 | Park .............................. 380/277 |
| 2006/0117177 A1 | 6/2006 | Buer |
| 2006/0280298 A1 | 12/2006 | Hauge et al. |
| 2007/0009098 A1 | 1/2007 | Tanaka et al. |
| 2007/0033399 A1 * | 2/2007 | Takeda .......................... 713/168 |
| 2007/0086593 A1 | 4/2007 | Denning et al. |
| 2007/0136607 A1 | 6/2007 | Launchbury et al. |
| 2008/0005588 A1 * | 1/2008 | Watson et al. ................ 713/193 |
| 2008/0034212 A1 | 2/2008 | Altieri |
| 2008/0063186 A1 | 3/2008 | Greco et al. |
| 2008/0077797 A1 * | 3/2008 | Greco et al. .................. 713/176 |
| 2008/0159543 A1 * | 7/2008 | Frisch et al. .................. 380/282 |
| 2008/0229117 A1 | 9/2008 | Shin et al. |
| 2008/0285747 A1 | 11/2008 | Kim et al. |
| 2009/0013196 A1 | 1/2009 | Ito et al. |
| 2009/0016532 A1 | 1/2009 | Baldischweiler |
| 2009/0034734 A1 | 2/2009 | Owens et al. |
| 2009/0074181 A1 * | 3/2009 | Pelletier ......................... 380/29 |
| 2009/0268903 A1 | 10/2009 | Bojinov et al. |

OTHER PUBLICATIONS

Office Action mailed Jul. 11, 2011, for related U.S. Appl. No. 12/110,631, filed Apr. 28, 2008, 18 Pages.

Office Action mailed Oct. 26, 2011, for related U.S. Appl. No. 12/110,631, filed Apr. 28, 2008, 21 Pages.

Office Action mailed Mar. 29, 2012, for related U.S. Appl. No. 12/110,631, filed Apr. 28, 2008, 20 Pages.

Notice of Allowance mailed Apr. 17, 2013, for related U.S. Appl. No. 12/110,631, filed Apr. 28, 2008, 21 Pages.

* cited by examiner

LOCATING CRYPTOGRAPHIC KEYS STORED IN A CACHE

RELATED APPLICATIONS

This application is a Continuation of U.S. patent application Ser. No. 12/110,631, filed Apr. 28, 2008, entitled LOCATING CRYPTOGRAPHIC KEYS STORED IN A CACHE; the aforementioned priority application being hereby incorporated by reference in its entirety for all purposes.

FIELD

The present disclosure relates generally to cryptography. In an example embodiment, the disclosure relates to locating cryptographic keys stored in a cache.

BACKGROUND

Without protection, data stored on storage devices (e.g., hard disks, tapes, non-volatile memories, and other storage devices) is accessible to anyone with access to the storage devices. In particular, data accessible by way of a computer network, such as network storage, is especially vulnerable to unauthorized access, modification or deletion.

To protect the stored data, the stored data may be encrypted. In general, encryption transforms the stored data using an algorithm to make the stored data on a storage device unreadable to anyone except those possessing particular cryptographic information used to encrypt the data. With such cryptographic information, the stored data may also be decrypted to make the stored data readable.

Currently, such cryptographic information is temporarily stored in a cache until retrieved for use in a cryptographic operation. To locate such cryptographic information in the cache, a hash function is applied to cryptographic information that is encrypted. This hash is then used as an address into the cache where such cryptographic information is stored. The application of the hash function is time consuming, complicated, and slows down the overall process of encrypting and decrypting data because a hash function needs to be applied for every lookup of such cryptographic information, which can occur frequently.

SUMMARY

Example embodiments provide various techniques for locating cryptographic keys stored in a cache. Generally, a cryptographic key is a code, number or value that, when taken together with an encryption algorithm, defines a unique transformation used to encrypt or decrypt data. Cryptographic keys may be stored in a cache until the cryptographic keys are retrieved for use in a cryptographic operation. A cache is a temporary storage area where the data (e.g., cryptographic keys) stored in the cache is duplicated at another location or another storage area. The cache may be used because the original data stored in the other location takes longer to retrieve when compared to retrieving the same, duplicated data from the cache. The cryptographic keys may therefore be stored in a cache for fast access.

The cache may also store cryptographic key identifiers associated with the cryptographic keys. In general, a cryptographic key identifier is a value that refers to or identifies a particular cryptographic key. Each cryptographic key stored in the cache may therefore be paired with a cryptographic key identifier. It should be appreciated that, as a security feature, cryptographic keys may be stored together in a secure storage area. This secure storage area may be secured such that the cryptographic keys are not openly accessible unless with a cryptographic key identifier. A cryptographic key identifier may therefore be used to locate a cryptographic key.

To retrieve a particular cryptographic key from the cache, this cryptographic key is to be first located within the cache. The cryptographic key may be located or found through reference to its cryptographic key identifier. In an example, a particular cryptographic key may be needed for a cryptographic operation. The cache is first searched to locate this cryptographic key. To locate the cryptographic key, the cryptographic key identifier that is associated with this cryptographic key is provided. In turn, the cryptographic key identifier may be used as an address into the cache. The address identifies a location of the cryptographic key within the cache. The cryptographic key may then be retrieved from the cache at the identified address and then used in the cryptographic operation.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

In general, cryptography is the process of hiding information. Cryptography includes the process of concealing and revealing concealed information. Information may be concealed by encoding (or encrypting) the information. In turn, encoded information may revealed by decoding (or decrypting) the information. Cryptographic techniques may be applied to secure data stored on a storage device. For example, the data stored on the storage device may be encrypted using an encryption algorithm to make the data unreadable. The encryption algorithm is controlled by one or more parameters called keys or cryptographic keys. A key may be used to encrypt and decrypt information. For example, such key may be used to encrypt data stored on a storage device to make the data unreadable. In turn, this key or another key may be used to decrypt the encrypted data to make it readable. It should be appreciated that different keys may be used for encryption and decryption, while in other instances the same keys may be used in both operations.

The cryptographic key may be identified or located with a cryptographic key identifier, which is a value that refers to or identifies the cryptographic key. The cryptographic keys and associated cryptographic key identifiers used in cryptographic operations may be temporarily stored in a cache. The cache is a temporary storage area where cryptographic keys can be stored for fast access. A particular cryptographic key from the cache may be needed for a cryptographic operation. As will be explained in more detail below, the cryptographic key may be located or found in the cache through reference to its cryptographic key identifier. The use of cryptographic key identifiers to locate cryptographic keys does not require additional calculations, such as the application of a hash function to the cryptographic keys. As a result, the cryptographic keys may be quickly located in a cache.

Figure 1:
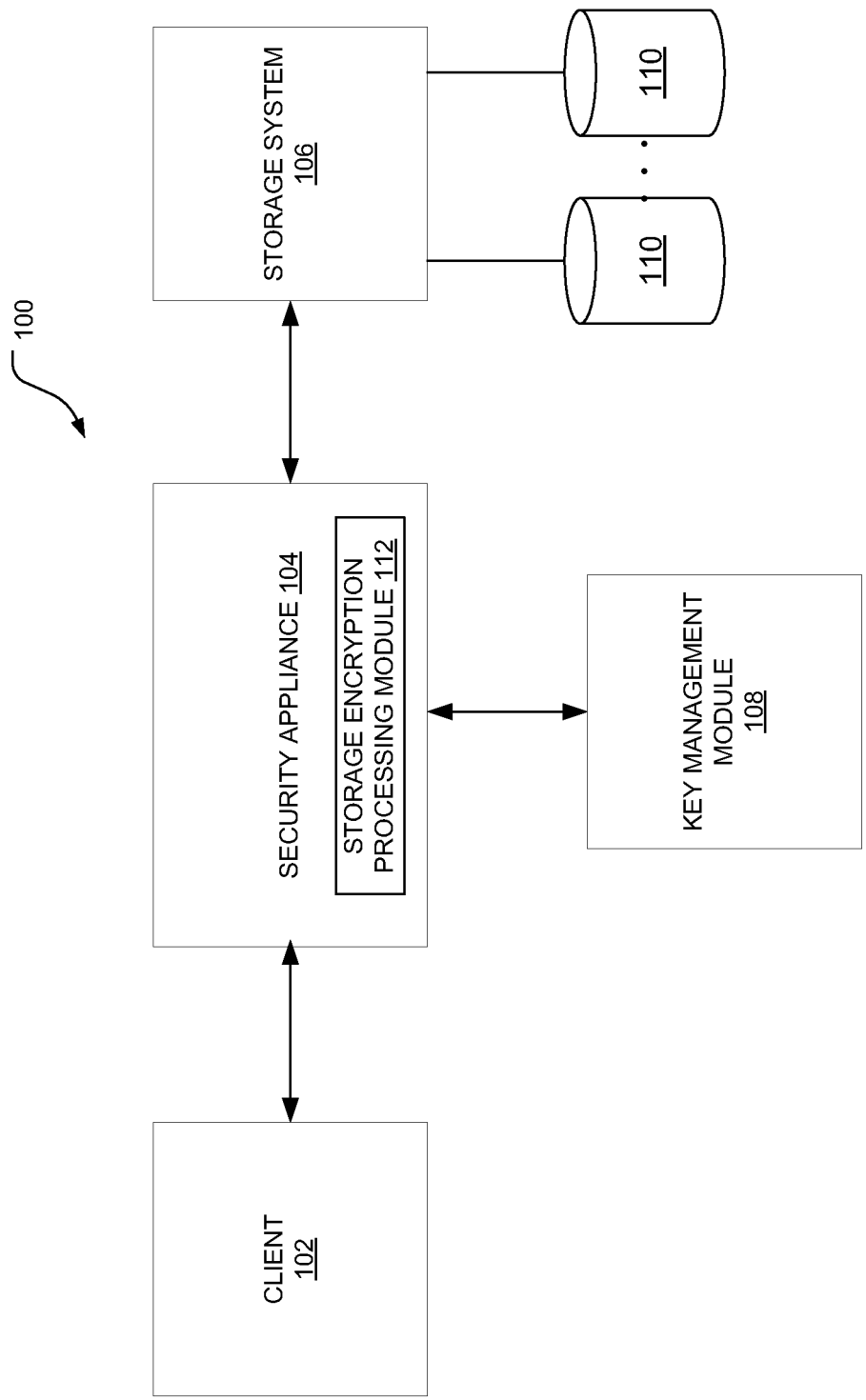
FIG. 1 depicts a simplified block diagram of a system, in accordance with an example embodiment, for locating cryptographic keys in a cache.

Figure depicts a simplified block diagram of system 100, in accordance with example embodiments, for locating cryptographic keys in a cache. FIG. 1 depicts an example system 100 that includes client 102, security appliance 104, storage system 106, storage devices 110, and key management module 108. In general, storage system 106 is a computing device that provides a storage service related to the organization of information on writable, persistent storage devices 110, such as non-volatile memories, tapes, hard drives, optical media or other storage devices. The storage system 106 can be deployed within a Storage Area Network (SAN) or a Network Attached Storage (NAS) environment.

When used within a NAS environment, for example, storage system 106 may be embodied as a file server that is configured to operate according to a client/server model of information delivery to thereby allow multiple client computing devices (e.g., client 102) to access shared resources, such as files, stored on the file server. The storage of information on a NAS environment can be deployed over a computer network that includes a geographically distributed collection on interconnected communication links, such as Ethernet, that allows client 102 to remotely access the information (e.g., files) on the file server. The client 102 can communicate with the file server by exchanging discrete frames or packets of data according to predefined protocols, such as Transmission Control/Internet Protocol (TCP/IP).

A SAN is a high-speed network that enables establishment of direct connections between storage system 106 and its storage devices 110. The SAN may thus be viewed as an extension to a storage bus and, as such, an operating system of storage system 106 enables access to stored data using block-based access protocols over an extended bus. In this context, the extended bus can be embodied as Fibre Channel, Computer System Interface (SCSI), Internet SCSI (iSCSI) or other network technologies.

As shown in FIG. 1, security appliance 104 is coupled between client 102 and storage system 106. The security appliance 104 intercepts a data access request issued by client 102 that is destined for storage system 106. The data access request may be a read request to retrieve certain data stored on storage devices 110 coupled to storage system 106 or a write request to store data on the storage devices. In an example write request, security appliance 104 intercepts the write request, encrypts the data associated with the write request, and forwards the encrypted data to storage system 106 for storage at a specified location (address) on one or more storage devices 110. In an example read request, security appliance 104 intercepts the read request and forwards the read request onto storage system 106, which returns the requested data to the security appliance in encrypted form. The security appliance 104 then decrypts the encrypted data and returns the decrypted data to client 102.

The key management module 108 is configured to store and manage the cryptography keys used by security appliance 104. In effect, key management module 108 serves as a repository for cryptographic keys used in system 100. In general, a cryptographic key (or encryption key) is information or a parameter that controls the operation of a cryptographic algorithm. For example, a cryptographic key is a code, number or value that, when taken together with an encryption algorithm, defines a unique transformation used to encrypt or decrypt data. Examples of cryptographic keys include hexadecimal 128-bit numbers, 192-bit numbers, and 256-bit numbers. The security appliance 104 uses one or more cryptographic keys to encrypt and decrypt data securely stored on storage system 106. The security appliance 104 may send requests for cryptographic keys to key management module 108 and, in response, the key management module sends the requested cryptographic keys on demand to the security appliance. The key management module 108 may further be configured to support multiple security appliances such that, when a particular security appliance 104 encounters a data access request for which the security appliance does not have the appropriate cryptographic key, that security appliance accesses the key management module to retrieve the appropriate cryptographic key.

When security appliance 104 receives one or more cryptographic keys from key management module 108, the security appliance temporarily stores the cryptographic keys in a cache, which is explained in more detail below. In the illustrative example embodiments, security appliance 104 employs storage encryption processing module 112 to quickly locate and retrieve the cryptographic keys from the cache. The security appliance 104 may then use the cryptographic keys in cryptographic operations.

In an alternative example (not illustrated), client 102 is in communication with storage system 106 and may access information stored on storage devices 110. As discussed above, storage system 106 is a computing device that provides a storage service related to the organization of information on writable, persistent storage devices 110. In this example, storage system 106 includes storage encryption processing module 112 and key management module 108. As a result, storage system 106 may itself store and manage cryptography keys, receive data access requests issued by client 102, and encrypt or decrypt data stored on or retrieved from storage devices 110, depending on the type of request.

Figure 2:
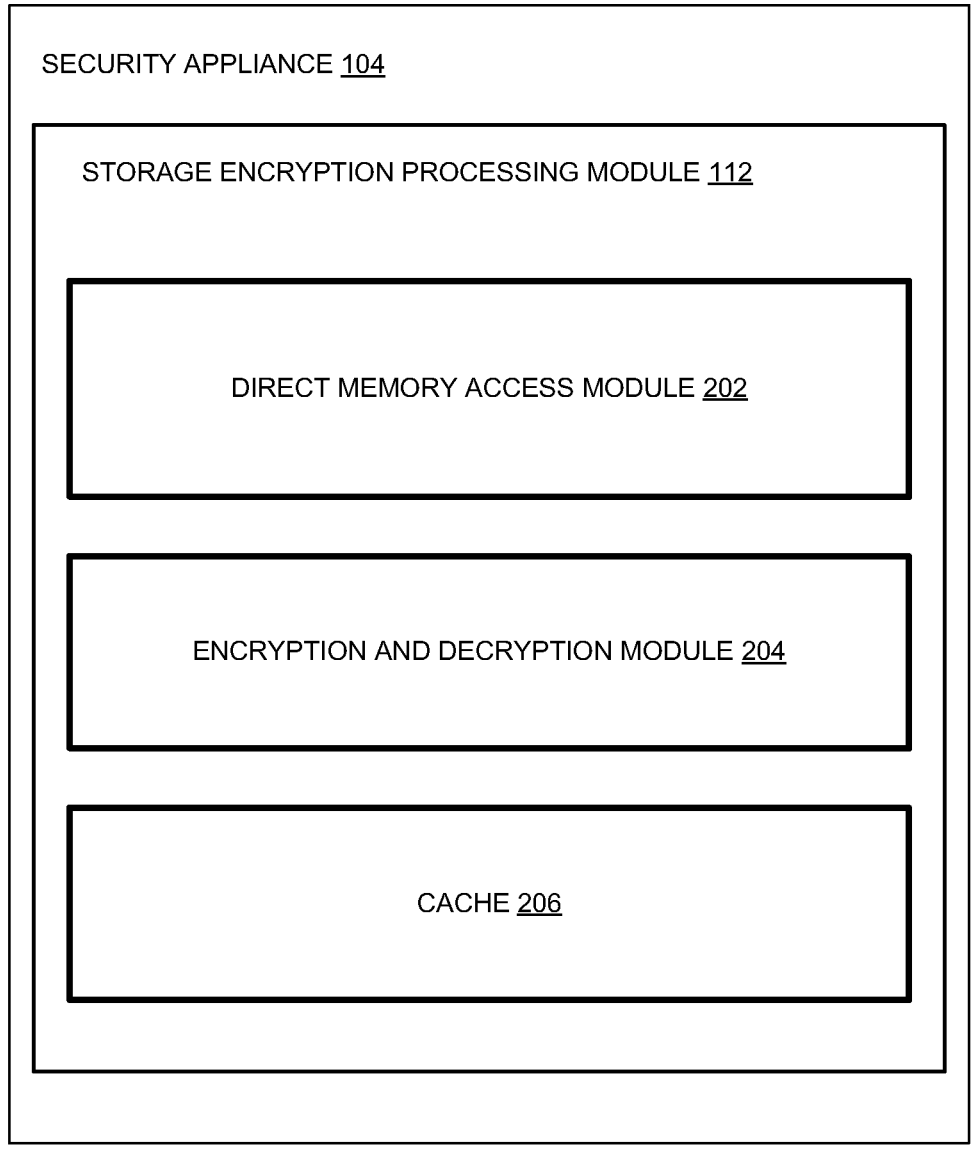
FIG. 2 depicts a simplified block diagram of modules, in accordance with an example embodiment, included in security appliance.

FIG. 2 depicts a simplified block diagram of modules, in accordance with an example embodiment, included in security appliance 104. It should be appreciated that security appliance 104 may include a variety of computing devices, such as a server, a network switch, a gateway or other computing devices. A network switch enables connectivity between devices, such as between a computing device and a storage device. An example of a network switch is a Fibre Channel switch used in SANs. In general, a Fibre Channel switch is a network switch that is compatible with the Fibre Channel protocol and enables connectivity between, for example, a computing device and a Fibre Channel storage device. Nodes within a SAN may interconnect with each other through connection with one or more Fibre Channel switches. The Fibre Channel switch provides routing and aliasing, name server, and zoning functions. An example of a gateway is an Internet Computer System Interface (iSCSI) gateway. In general, an iSCSI gateway serves as an entrance to another network, such as Fibre Channel, and vice versa. As such, the iSCSI gateway enables connectivity to iSCSI devices. For example, the iSCSI gateway may create a connection between Fibre Channel and iSCSI such that iSCSI clients can connect to Fibre Channel storage.

The security appliance 104 may include storage encryption processing module 112. The storage encryption processing module 112 may further host direct memory access module 202, encryption and decryption module 204, and cache 206. The direct memory access module 202 allows storage encryption processing module 112 within security appliance 104 to directly read from and write to a memory, such as cache 206. The encryption and decryption module 204 provides storage encryption processing module 112 with the capability to encrypt and decrypt data. To encrypt or decrypt data, a variety of encryption algorithms, such as Advanced Encryption Standard (AES), can be employed to transform unencrypted data into encrypted data intended for secure storage on the storage system or to transform encrypted data into unencrypted data.

The cryptographic keys used in the cryptographic operations are temporarily stored in cache 206. The cache 206 is a temporary storage area where cryptographic keys can be stored for fast access. That is, a cache is a temporary storage area where the data (e.g., cryptographic keys) stored in the cache is duplicated at another location or another storage area (e.g., key management module). The cache may be used because the original data stored in the other location takes longer to retrieve when compared to retrieving the same, duplicated data from the cache. In an example embodiment, cache 206 may be a register, which may be implemented in a block of volatile or non-volatile memory. Here, storage encryption processing module 112 may temporarily store cryptographic keys received from, for example, a key management module in cache 206. The cache 206 stores a portion of the cryptographic keys from the key management module. For example, cache 206 may store up to 16 cryptographic keys and other information associated with the cryptographic keys (e.g., cryptographic key identifiers, key signatures, and other information). The size of cache 206 may, for example, range from 1 kilobyte to 1 megabyte. The encryption and decryption module 204 may locate and retrieve a particular cryptographic key from cache 206 for use in a cryptographic operation. As explained in more detail below, the cryptographic keys stored in cache 206 may be located by referencing the cryptographic key identifiers associated with the cryptographic keys. In addition to storing cryptographic keys, cache 206 may also be configured to store other information, such as key packets and key signatures, which is further explained in more detail below.

It should be appreciated that storage encryption processing module 112 may be in the form of software that is processed by a processor. In another example, storage encryption processing module 112 may be in the form of firmware that is processed by Application Specific Integrated Circuits (ASICs), which may be integrated into a circuit board. Alternatively, storage encryption processing module 112 may be in the form of one or more logic blocks included in a programmable logic device (e.g., a field-programmable gate array). The described modules may be adapted, and/or additional structures may be provided, to provide alternative or additional functionalities beyond those specifically discussed in reference to FIG. 2. Examples of such alternative or additional functionalities will be discussed in reference to the flow diagrams discussed below. The modifications or additions to the structures described in relation to FIG. 2 to implement these alternative or additional functionalities will be implementable by those skilled in the art, having the benefit of the present specification and teachings.

Figure 3:
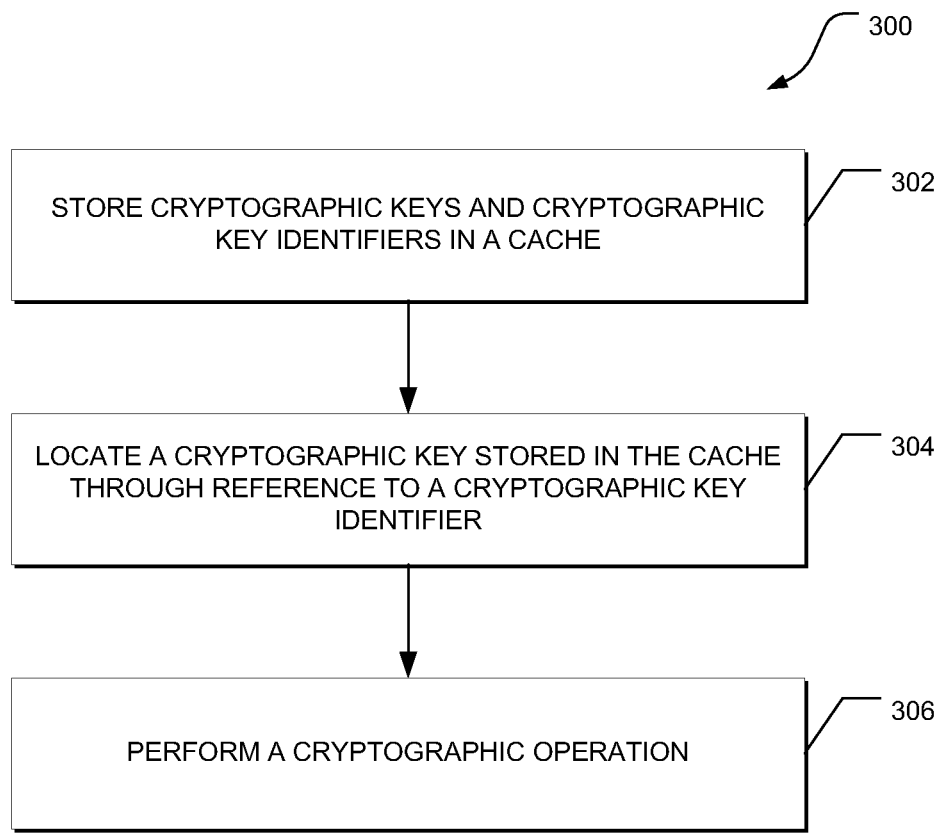
FIG. 3 depicts a flow diagram of a general overview of a method, in accordance with an example embodiment, for locating a cryptographic key in a cache.

FIG. 3 depicts a flow diagram of a general overview of a method 300, in accordance with an example embodiment, for locating a cryptographic key in a cache. In an example embodiment, method 300 may be implemented by storage encryption processing module 112 of FIG. 2 and employed in security appliance 104. As depicted in FIG. 3, cryptographic keys and cryptographic key identifiers that are associated with the cryptographic keys are stored in the cache at 302. A cryptographic key identifier is a unique value that is assigned to a cryptographic key. The cryptographic key identifier is configured to identify or reference a particular cryptographic key. An example of a cryptographic key identifier is a random number assigned to a particular cryptographic key. For example, a cryptographic key identifier may be a random 0x64-bit hexadecimal number (e.g., 0x00000000000011bcf). As a security feature, instead of referencing the cryptographic key directly, a cryptographic key identifier may be instead used. The cryptographic keys may be stored together in a secure storage area, such as the key management module described in FIGS. 1a and 1b, such that the cryptographic keys are not openly accessible unless with a cryptographic key identifier. As a result of referencing the cryptographic keys with cryptographic identifiers, the exposure of cryptographic keys is minimized in cryptographic operations.

It should be appreciated that the associations or correlations of the cryptographic key identifiers with the cryptographic keys can be stored in a key management module, which may store all the cryptographic keys referenced by a storage system. In this example, when a security appliance needs a particular cryptographic key from the key management module, the security appliance sends a cryptographic key request that references a cryptographic key identifier to the key management module. The key management module retrieves the cryptographic key stored in the key management module using the cryptographic key identifier based on the stored associations, and then transmits the cryptographic key to the security appliance.

Still referring to FIG. 3, a cryptographic key is then located in the cache through reference to a cryptographic key identifier at 304. Here, each cryptographic key identifier stored in the cache is associated with a respective cryptographic key that is also stored in the cache. The association of each cryptographic key identifier with its cryptographic key is maintained within the cache. With the association, a cryptographic key can be located in the cache by referencing its cryptographic key identifier. It should be appreciated that any two, distinct cryptographic keys stored in a cache cannot have identifiers, which identify the locations of the cryptographic keys, with the same values. Else, the cryptographic keys cannot be located in the cache. As discussed above, a cryptographic key identifier is a unique value that is assigned to a cryptographic key. As such, every cryptographic key identifier is unique. The cryptographic key identifier may therefore be used to uniquely identify or locate an associated cryptographic key. In effect, the cryptographic key identifiers may serve as an index in the cache for locating cryptographic keys.

For example, as explained in more detail below, the cryptographic key identifiers are used as addresses into the cache. An address identifies a location in the cache. The cryptographic key identifiers therefore may be used to locate cryptographic keys stored in the cache. A search of one or more cryptographic keys stored in the cache may be made by referencing their associated cryptographic key identifiers instead of applying a hash function. As a result, a lookup using cryptographic key identifiers can result in a fast lookup. As used herein, it should be noted that the terms "to lookup" and "to locate" may be used interchangeably.

After the cryptographic key is located in the cache, the cryptographic key is retrieved from the cache and a cryptographic operation may be performed using the cryptographic key at 306. In an example, the cryptographic operation may be an encryption operation where the cryptographic key may be used to encrypt data. In another example, the cryptographic operation may be a decryption operation where the cryptographic key may be used to decrypt data.

Figure 4:
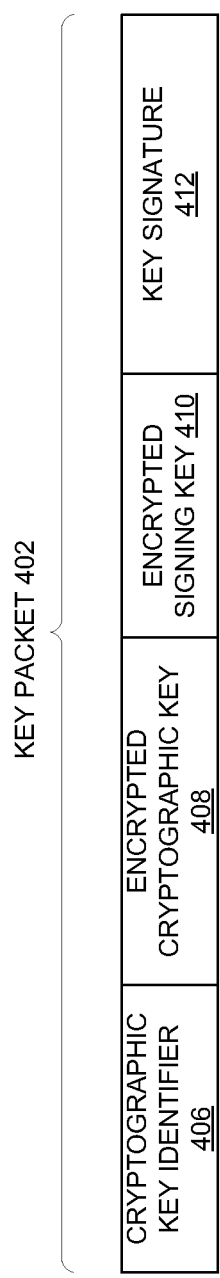
FIG. 4 depicts a block diagram illustrating a key packet, in accordance with an example embodiment.

FIG. 4 depicts a block diagram illustrating a key packet 402, in accordance with an example embodiment. Key packet 402 may be a 128 bytes structure that includes cryptographic key identifier 406, encrypted cryptographic key 408, encrypted signing key 410, and key signature 412. A storage encryption processing module may receive key packet 402 and a cryptographic key can be located from a cache based on the key packet.

The cryptographic key identifier 406 may be 32 bytes in size and is associated with or configured to identify encrypted cryptographic key 408. The cryptograph key identifier 406 may be in clear text (or unencrypted). Following cryptographic key identifier 406 is encrypted cryptographic key 408. Encrypted cryptographic key 408 may be 32 bytes in size and is an encrypted form of a cryptographic key. Encrypted signing key 410 follows encrypted cryptographic key 408 and may also be 32 bytes in size. Encrypted signing key 410 is an encrypted form of a signing key. In general, a signing key can be used to encrypt or sign a cryptographic key, such as encrypted cryptographic key 408, for use in public key cryptography. Key signature 412 follows encrypted signing key 410 and may also be 32 bytes in size. Generally, key signature 412 may be used to verify or authenticate a cryptographic key, such as encrypted cryptographic key 408. In the example of FIG. 4, key signature 412 may be in clear text. It should be appreciated that in other example embodiments, key packet 402 may include fewer or more fields apart from those fields (e.g., cryptographic key identifier 406, key signature 412, and other fields) depicted in FIG. 4. For example, key signature 412 and encrypted signing key 410 may be excluded from key packet 402.

Figure 5:
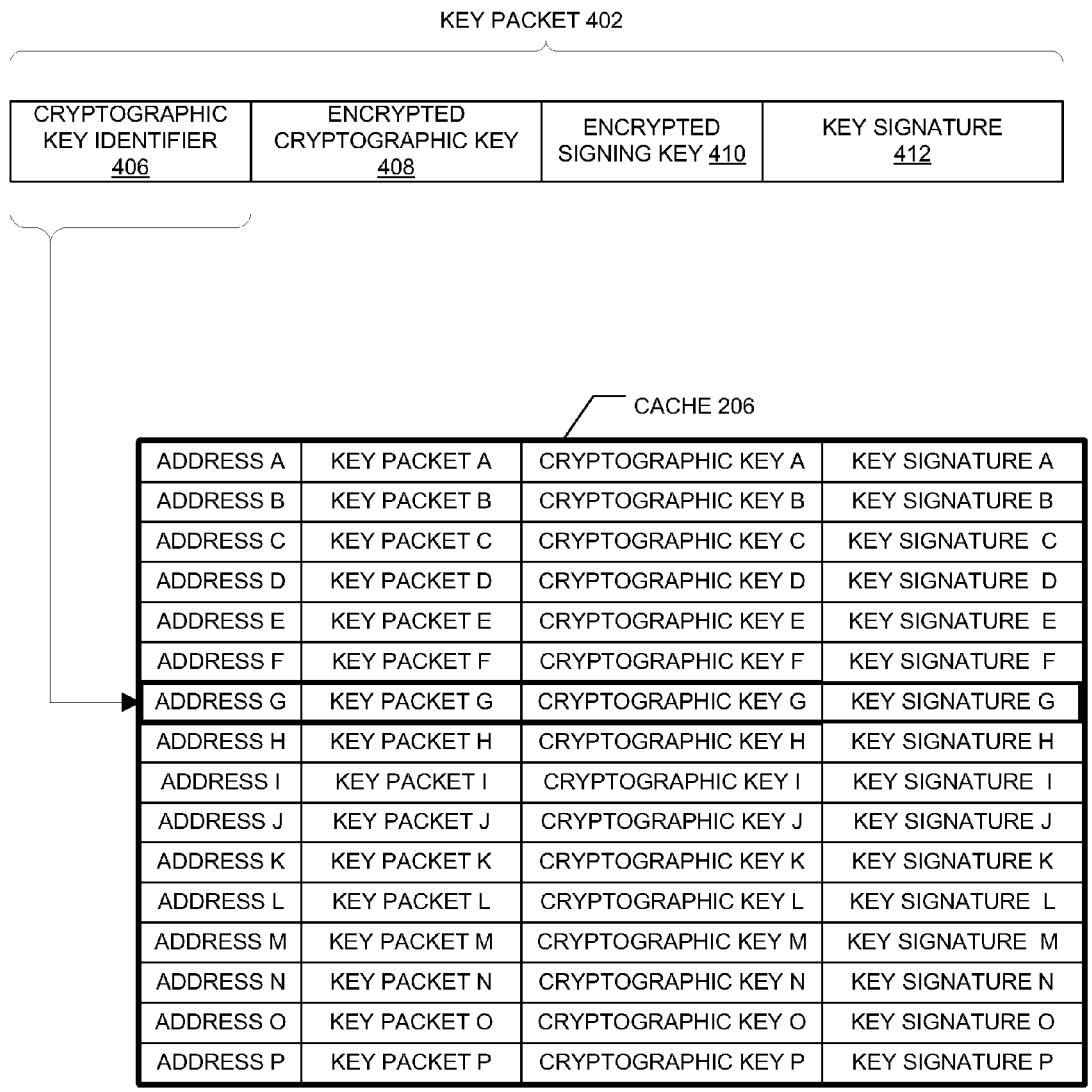
FIG. 5 depicts a simplified diagram of a cache, in accordance with an example embodiment, and an example lookup of a cryptographic key from the cache.

FIG. 5 depicts a simplified diagram of a cache 206, in accordance with an example embodiment, and an example lookup of a cryptographic key from the cache. In this example, cache 206 is configured to store addresses A-P, key packets A-P, cryptographic keys A-P, and key signatures A-P. The addresses A-P identify locations of key packets A-P, cryptographic keys A-P, and key signatures A-P. For example, address A identifies locations of key packet A, cryptographic key A, and key signature A. In another example, address G identifies locations of key packet G, cryptographic key G, and key signature G. The addresses A-P are defined by cryptographic key identifiers (not shown). For example, address A may be defined by cryptographic key identifier A that is associated with key packet A, cryptographic key A, and key signature A. In another example, address G may be defined by cryptographic key identifier G (not shown) that is associated with key packet G, cryptographic key G, and key signature G.

In the example of FIG. 5, key packet 402 may be received. The key packet 402 may include cryptographic key identifier 406, encrypted cryptographic key 408, encrypted signing key 410, and key signature 412. Encrypted cryptographic key 408 is an encrypted form of a particular cryptographic key. This particular cryptographic key may be stored in cache 206 and may be obtained from the cache without a further decryption operation to extract the cryptographic key from encrypted cryptographic key 408. This particular cryptographic key may be located in cache 206 through reference to cryptographic key identifier 406. Here, cryptographic key identifier 406 is extracted from or retrieved from key packet 402. Cryptographic key identifier 406 may then be compared with the addresses to identify a match. If a match exists, then the particular cryptographic key may be located at the matched address. For example, as depicted in FIG. 5, cryptographic key identifier 406 matches address G. Accordingly, cryptographic key G may therefore be the particular cryptographic key that is encrypted in encrypted cryptographic key 408. Key packet G and key signature G that are also associated with cryptographic key G are also located at address G. As explained in more detail below, key packet G may be used to further verify that located cryptographic key G is associated with cryptographic key identifier 406. On the other hand, if cryptographic key identifier 406 does not match any address in cache, then the cryptographic key may not be stored in cache 206.

The addresses A-P, key packets A-P, cryptographic keys A-P, and key signatures A-P depicted in FIG. 5 are organized in rows and columns in cache 206. However, it should be appreciated that cache 206 may store information in blocks. Accordingly, the key packets A-P, cryptographic keys A-P, and key signatures A-P may be organized in blocks. Furthermore, the addresses A-P may be the actual memory locations within cache 206. Such addresses may be stored in an allocation table. Alternatively, the addresses A-P may serve as an index assigned to a group of associated information (e.g., key packet A, cryptographic key A, and key signature A). Accordingly, such index may be stored in cache 206 and referenced when locating a particular cryptographic key.

Figure 6:
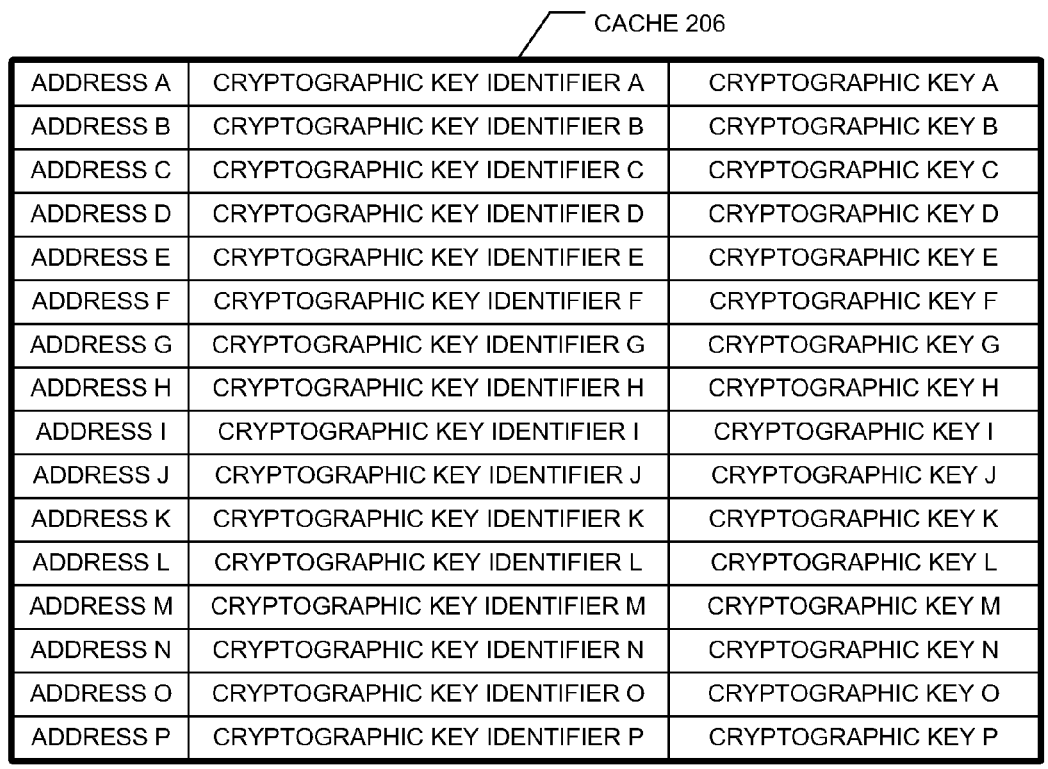
FIG. 6 depicts a simplified diagram of another example of a cache, in accordance with another example embodiment.

FIG. 6 depicts a simplified diagram of another example of a cache 206, in accordance with another example embodiment. Here, cache 206 is configured to store cryptographic key identifiers A-P and cryptographic keys A-P. Again, addresses A-P identify locations of cryptographic key identifiers A-P and cryptographic keys A-P. The addresses A-P are defined by cryptographic key identifiers. As explained in more detail below, rather than key packets, cryptographic key identifiers A-P may be used to verify that a located cryptographic key stored in cache 206 is associated with a cryptographic key identifier retrieved from a key packet.

Figure 7:
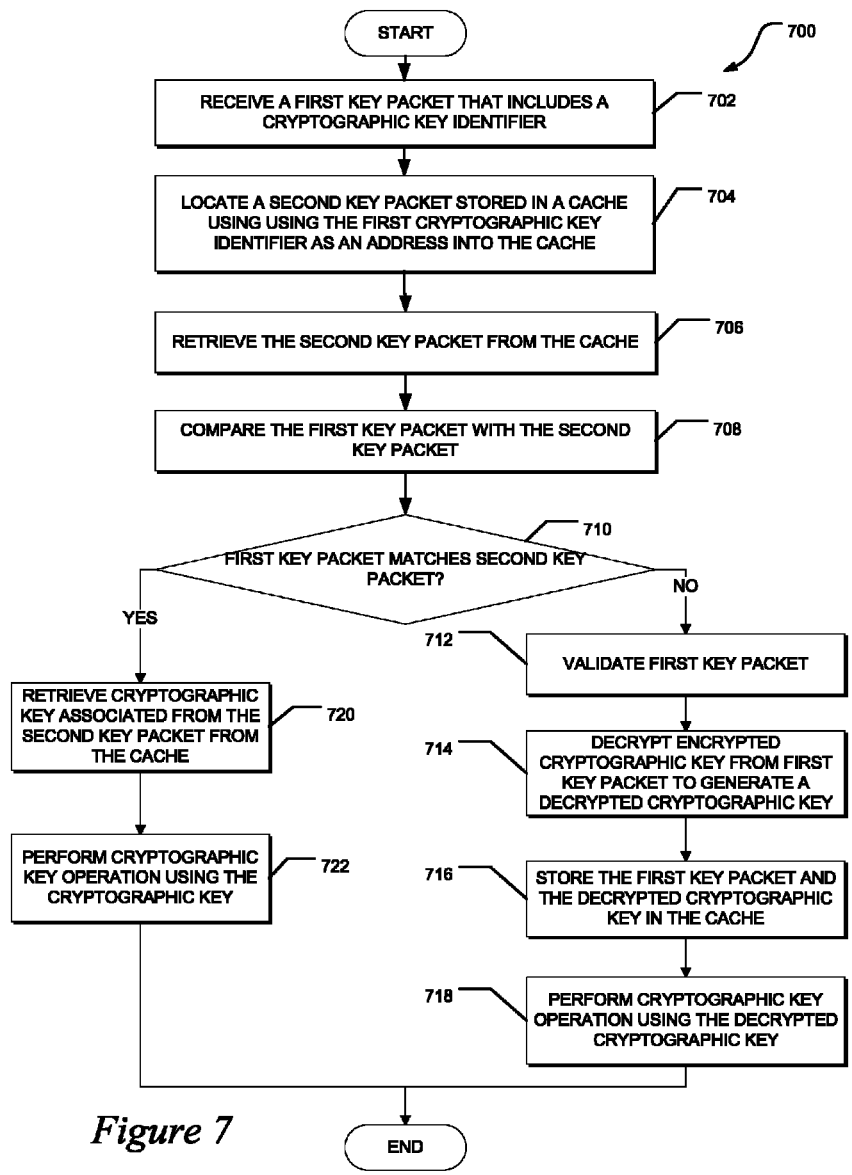
FIG. 7 depicts a flow diagram of detailed methods, in accordance with an example embodiment, for locating a cryptographic key from a cache.

FIG. 7 depicts a flow diagram of detailed methods 700, in accordance with an example embodiment, for locating a cryptographic key from a cache. In an example embodiment, method 700 may be implemented by storage encryption processing module 112 of FIG. 2 and employed in security appliance 104. As depicted in FIG. 7, a first key packet is received at 702. This first key packet may be received from a variety of applications and/or systems that need a particular cryptographic key for a cryptographic operation. Examples of applications and/or systems include a storage system, a security appliance, and a storage encryption processing module, which are described in detail above. This first key packet includes a cryptographic key identifier and an encrypted cryptographic key. In addition, this first key packet may also include an encrypted signing key and a key signature.

A second key packet stored in a cache may be located at 704 using the cryptographic key identifier, which is retrieved from the first key packet, as an address into the cache. As discussed above, the addresses stored in the cache may be defined by cryptographic key identifiers and the second key packet may be located by comparing the cryptographic key identifier from the first key packet with each address. If an address that matches the cryptographic key identifier is found, then the second key packet is retrieved from the cache at 706. Similar to the first key packet, the second key packet may also include a cryptographic key identifier, an encrypted cryptographic key, an encrypted signing key, and a key signature.

In an example embodiment, the first key packet is compared with the second key packet at 708 to determine if a match exists between the first and second key packets. The comparison may, for example, be a bitwise comparison that compares one or more bits of the first and second key packets. The comparison can be made to verify that the cryptographic key stored in the cache matches the same cryptographic key referenced in the first key packet. For example, referring to FIG. 5, if cryptographic key identifier 406 points to address G, then key packet G located at address G is retrieved from cache 206 and compared with key packet 402.

Returning to FIG. 7, in another example embodiment, instead of comparing the complete first and second key packets, a portion of the first key packet may be compared with a portion of the second key packet. The portion may include any suitable portion of the first and second key packets (e.g., cryptographic key identifier, encrypted cryptographic key, encrypted signing key, key signature, a combination of one or more the fields or one or more portions of the fields). For example, the portion compared may be the cryptographic key identifier portions of the first and second key packets because the cryptographic key identifier is a random, unique number. With reference to FIG. 6, for example, cache 206 stores cryptographic key identifiers A-P and their associated cryptographic keys A-P. If a cryptographic key identifier from a received key packet points to address G, then cryptographic key identifier G located at address G is retrieved from cache 206 and compared with the cryptographic key identifier from the key packet.

A determination is then made at 710 to identify whether the first key packet matches the second key packet, which is described above. If a match exists, then the cryptographic key located at the address is retrieved from the cache at 720. A cryptographic key operation may then be performed at 722 using the retrieved cryptographic key.

On the other hand, if the match does not exist (first key packet is distinct from second key packet), the cache is updated to store a new cryptographic key. Here, the first key packet is validated at 712. A variety of validation techniques may be used to validate the first key packet. For example, a hash function may be applied to a portion of the first key packet and then compared with the key signature included in the first key packet. After validation, the encrypted cryptographic key is retrieved from the first key packet and then decrypted at 714 to generate a decrypted cryptographic key (or cryptographic key). The first key packet and the decrypted cryptographic key are stored in the cache at the address defined by the cryptographic key identifier, thereby replacing an existing cryptographic key in the cache at the same address. In effect, the first key packet and the decrypted cryptographic key replace the second key packet and a cryptographic key associated with the second key packet, respectively, at a location identified by the address in the cache. As a result, the cache is updated with a new cryptographic key retrieved from the first key packet, which may be referenced again in future cryptographic operations. Furthermore, in an example embodiment, the key signature from the first key packet may be stored in the cache for use in a variety of cryptographic operations. A cryptographic key operation may then be performed at 718 using the decrypted cryptographic key from the first key packet.

Figure 8:
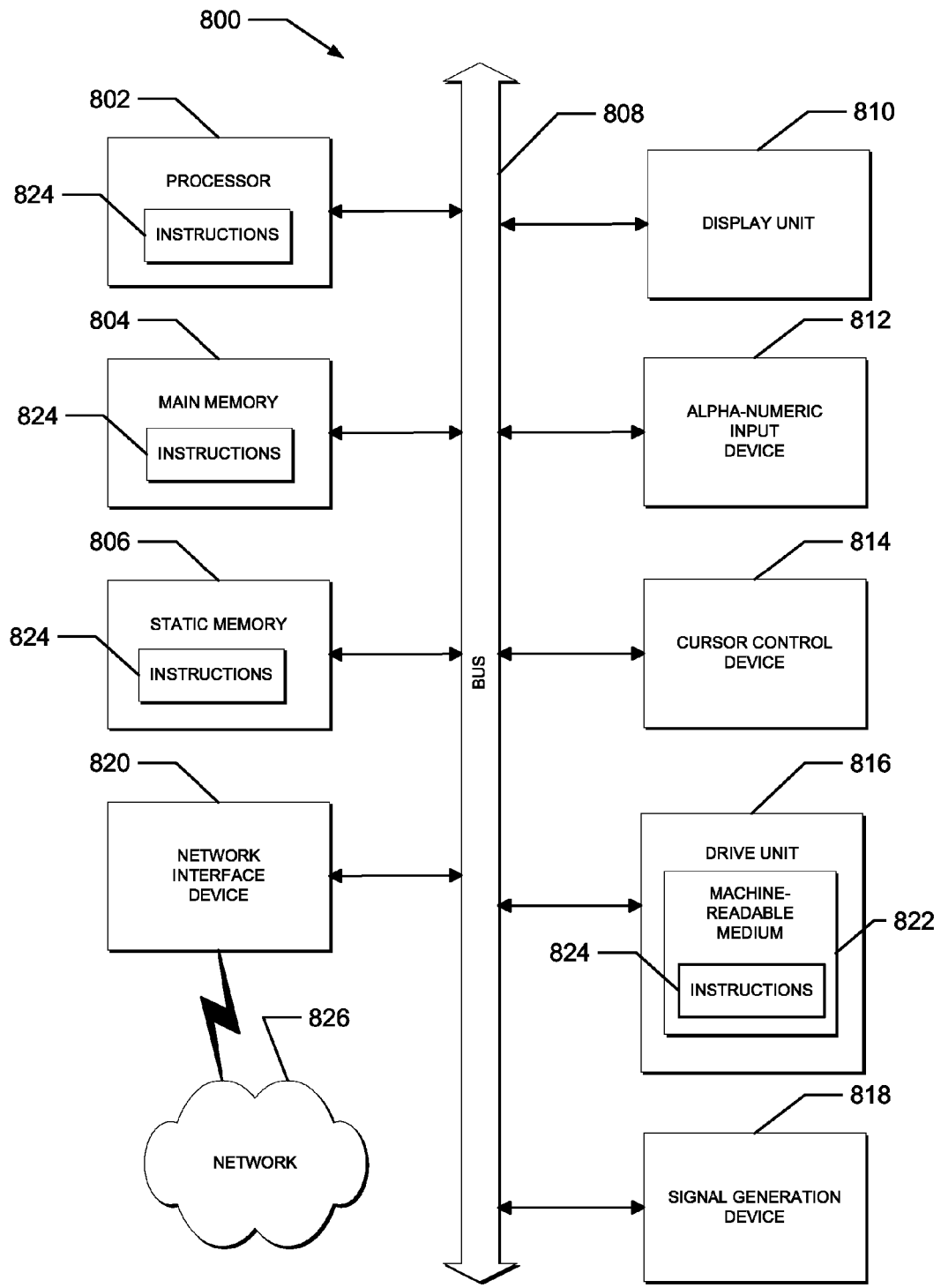
FIG. 8 depicts a simplified block diagram of a machine in the example form of a computing system within which a set of instructions, for causing the machine to perform any one or more of the methodologies discussed herein, may be executed.

FIG. 8 depicts a simplified block diagram of a machine in the example form of a computing system (or computing device) within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a server computer, a network switch, a set-top box (STB), a gateway, an appliance or any suitable machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 800 includes processor 802 (e.g., a central processing unit (CPU), a graphics processing unit (GPU) or both), main memory 804 and static memory 806, which communicate with each other via bus 808. Computing system 800 may further include display unit 810 (e.g., a liquid crystal display (LCD)). Computing system 800 also includes alphanumeric input device 812 (e.g., a keyboard), user interface (UI) navigation device 814 (e.g., a mouse), disk drive unit 816, signal generation device 818 (e.g., a speaker) and network interface device 820.

Disk drive unit 816 includes machine-readable medium 822 on which is stored one or more sets of instructions and data structures (e.g., software 824) embodying or utilized by any one or more of the methodologies or functions described herein. Software 824 may also reside, completely or at least partially, within main memory 804 and/or within processor 802 during execution thereof by computing system 800, with main memory 804 and processor 802 also constituting machine-readable, tangible media. Software 824 may further be transmitted or received over network 826 via network interface device 820 utilizing any one of a number of well-known transfer protocols (e.g., Hypertext Transfer Protocol (HTTP)).

While machine-readable medium 822 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for locating cryptographic key identifiers in a cache may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is being claimed is:

1. A method comprising:
receiving a first key packet that includes a cryptographic key identifier and an encrypted cryptographic key, wherein the first key packet also includes an encrypted signing key and a key signature;
locating a second key packet stored in a cache by using the cryptographic key identifier of the first key packet as a memory address in the cache, wherein the second key packet is stored at the memory address identified by the cryptographic key identifier of the first key packet;
determining that the first key packet matches the second key packet by comparing the encrypted cryptographic key of the first key packet with an encrypted cryptographic key of the second key packet;
in response to determining that the first key packet matches the second key packet, retrieving an unencrypted cryptographic key from the memory address in the cache, wherein the unencrypted cryptographic key is an unencrypted version of the encrypted cryptographic key; and
performing a cryptographic key operation using the retrieved unencrypted cryptographic key.

2. The method of claim 1, wherein the cache stores a plurality of key packets at a corresponding plurality of memory addresses.

3. The method of claim 2, wherein locating the second key packet stored in the cache includes comparing the cryptographic key identifier of the first key packet with each memory address of the plurality of memory addresses in the cache.

4. The method of claim 1, wherein the cryptographic key identifier of the first key packet is a randomly assigned number.

5. The method of claim 1, wherein the cryptographic key operation includes a decryption operation.

6. The method of claim 1, wherein the cryptographic key operation includes an encryption operation.

7. A non-transitory computer-readable medium storing instructions that, when executed by a processor, cause the processor to perform operations comprising:
receiving a first key packet that includes a cryptographic key identifier and an encrypted cryptographic key, wherein the first key packet also includes an encrypted signing key and a key signature;
locating a second key packet stored in a cache by using the cryptographic key identifier of the first key packet as a memory address in the cache, wherein the second key packet is stored at the memory address identified by the cryptographic key identifier of the first key packet;
determining that the first key packet matches the second key packet by comparing the encrypted cryptographic key of the first key packet with an encrypted cryptographic key of the second key packet;
in response to determining that the first key packet matches the second key packet, retrieving an unencrypted cryptographic key from the memory address in the cache, wherein the unencrypted cryptographic key is an unencrypted version of the encrypted cryptographic key; and
performing a cryptographic key operation using the retrieved unencrypted cryptographic key.

8. The non-transitory computer-readable medium of claim 7, wherein the cache stores a plurality of key packets at a corresponding plurality of memory addresses.

9. The non-transitory computer-readable medium of claim 8, wherein the instructions cause the processor to locate the second key packet stored in the cache by comparing the cryptographic key identifier of the first key packet with each memory address of the plurality of memory addresses in the cache.

10. The non-transitory computer-readable medium of claim 7, wherein the cryptographic key identifier of the first key packet is a randomly assigned number.

11. The non-transitory computer-readable medium of claim 7, wherein the cryptographic key operation includes a decryption operation.

12. The non-transitory computer-readable medium of claim 7, wherein the cryptographic key operation includes an encryption operation.

13. A system comprising:
one or more client devices;
a storage system coupled to a plurality of storage devices; and
a computing device to communicate with the one or more client devices and the storage system, the computing device comprising:
a processor; and
a memory storing instructions that cause the processor to perform operations comprising:
receiving a first key packet that includes a cryptographic key identifier and an encrypted cryptographic key, wherein the first key packet also includes an encrypted signing key and a key signature;
locating a second key packet stored in a cache by using the cryptographic key identifier of the first key packet as a memory address in the cache, wherein the second key packet is stored at the memory address identified by the cryptographic key identifier of the first key packet;
determining that the first key packet matches the second key packet by comparing the encrypted cryptographic key of the first key packet with an encrypted cryptographic key of the second key packet;
in response to determining that the first key packet matches the second key packet, retrieving an unencrypted cryptographic key from the memory address in the cache, wherein the unencrypted cryptographic key is an unencrypted version of the encrypted cryptographic key; and
performing a cryptographic key operation using the retrieved unencrypted cryptographic key.

14. The system of claim 13, wherein the cryptographic key identifier of the first key packet is a randomly assigned number.

15. The system of claim 13, wherein the cryptographic key operation includes a decryption operation or an encryption operation.

* * * * *